Figure 1:
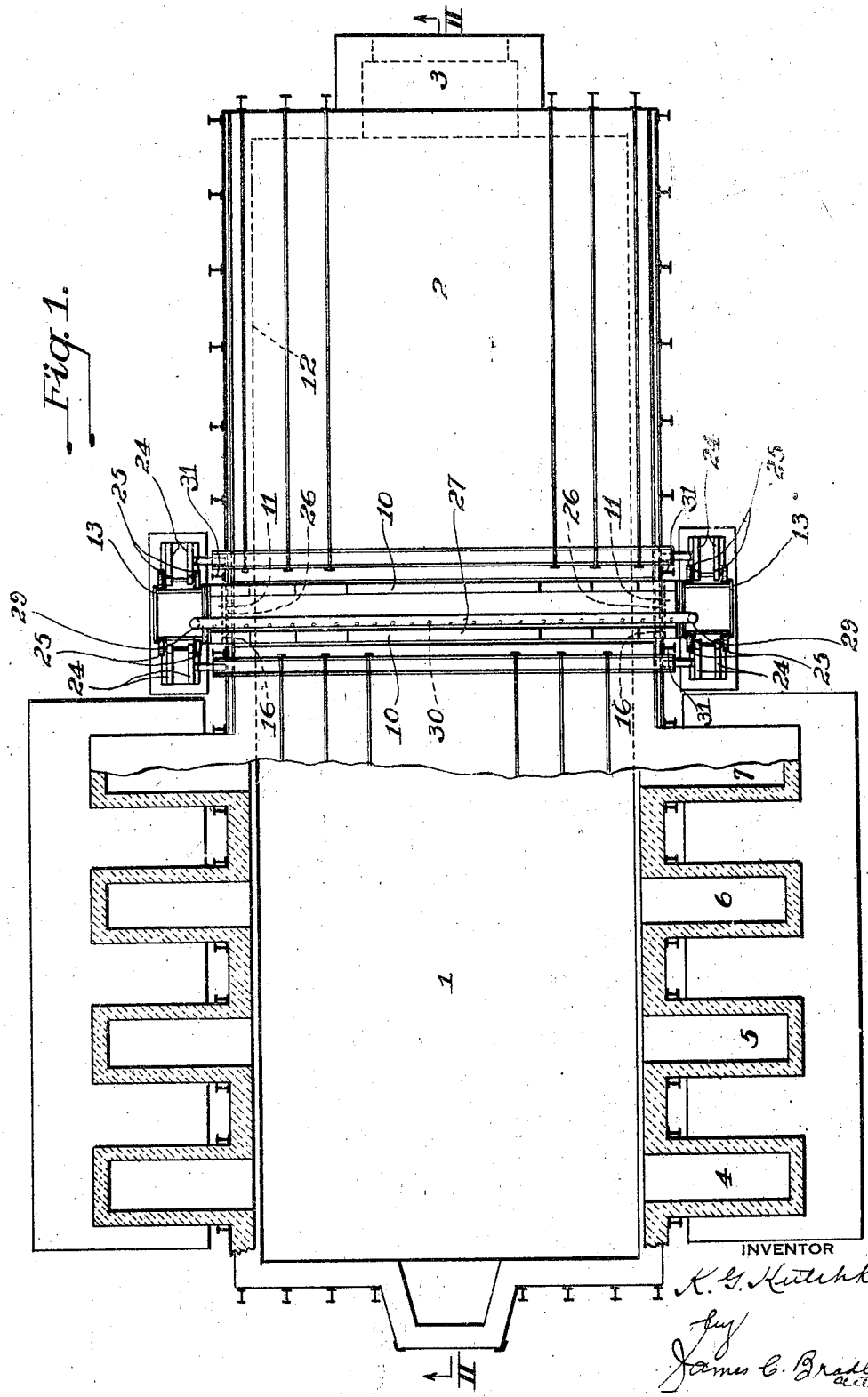

Aug. 9, 1927.

K. G. KUTCHKA 1,638,737

GLASS MELTING TANK

Filed Dec. 10, 1925

4 Sheets-Sheet 4

INVENTOR
Karl G. Kutchka
by
James C. Bradley
atty.

Patented Aug. 9, 1927.

1,638,737

UNITED STATES PATENT OFFICE.

KARL G. KUTCHKA, OF WILKINSBURG, PENNSYLVANIA, ASSIGNOR TO PITTSBURGH PLATE GLASS COMPANY, A CORPORATION OF PENNSYLVANIA.

GLASS-MELTING TANK.

Application filed December 10, 1925. Serial No. 74,557.

The invention relates to glass melting tanks, and has for its objects the provision of means for improving the independent control of the temperatures in the two ends of the tank. It often happens that it is desired to maintain a much higher temperature in the melting end of the tank than in the working or withdrawing end and this result has been secured in some cases by the provision of an arch intermediate the two ends of the tank partially closing off the space above the surface of the glass, but this expedient helps the situation only in part, since the arch as thus constructed may cut off too much or too little of the area; so that the difference in temperature between the tank ends is usually too great or too little. Further, the requirements of the tank may vary, so that a separating arch, which, during one period of operation and under certain conditions, may be sufficient for the purpose, is during another period of operation and under different conditions, insufficient to give the desired result. The present invention is designed to overcome these difficulties, so that the degree of separation between the ends of the furnace may be adjusted to give exactly the difference in temperature desired.

Briefly stated, this is accomplished by the provision of a movable furnace section having its top portion in the form of an arch following the contour of the roof or arch of the furnace and mounted for vertical adjustment, so that any desired degree of separation may be secured between the regenerator, or melting end of the tank, and the working or withdrawing end. More specifically, this result is accomplished by mounting the movable arch section and its side walls in a rigid supporting framework of commercial steel sections guided for vertical movement, and provided with means for moving it up and down. The movable arch is made in U-shape in cross section to facilitate its cooling, and so avoid the destruction of the portion of the arch on the side toward the melting end of the furnace, and means are also preferably provided for artificially cooling (preferably by air) the arch portion in order to still further protect it.

Figure 2:
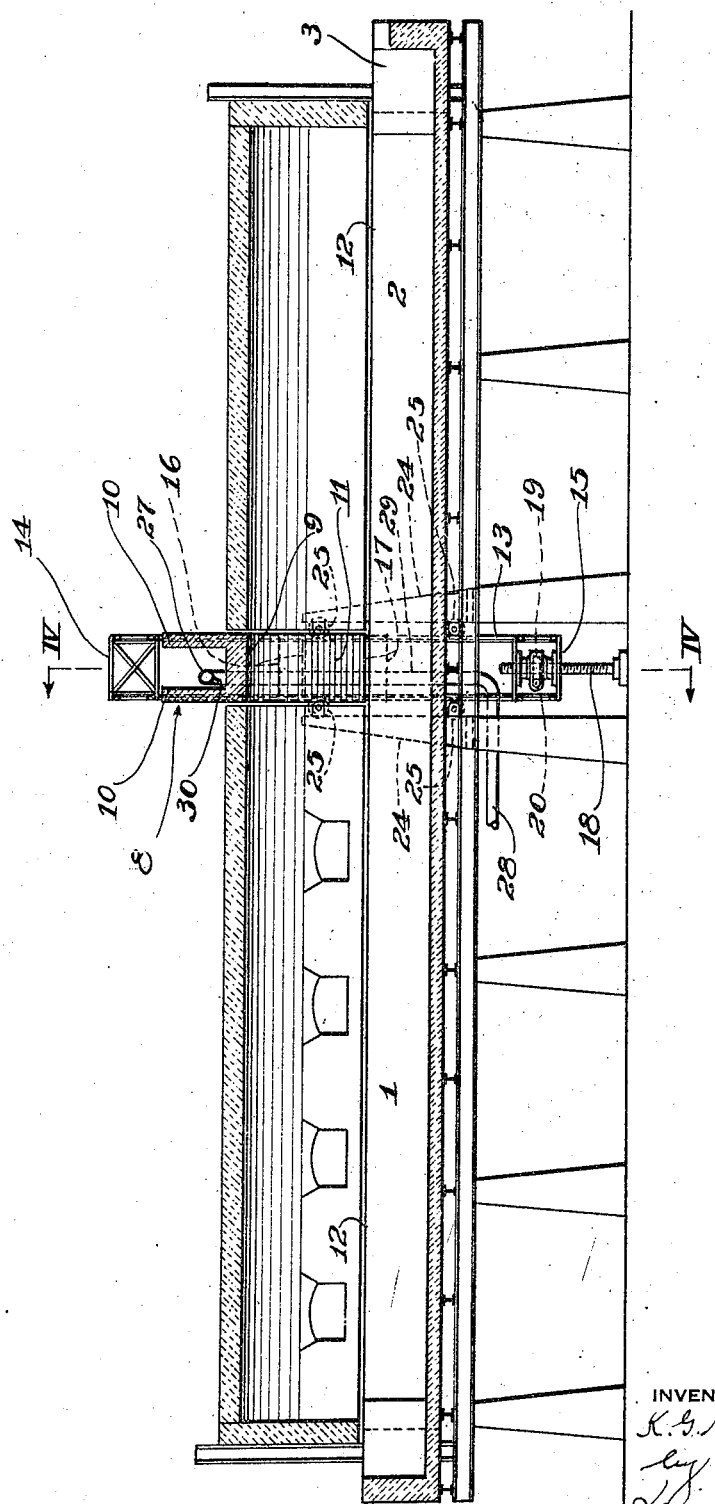
Figure 3:
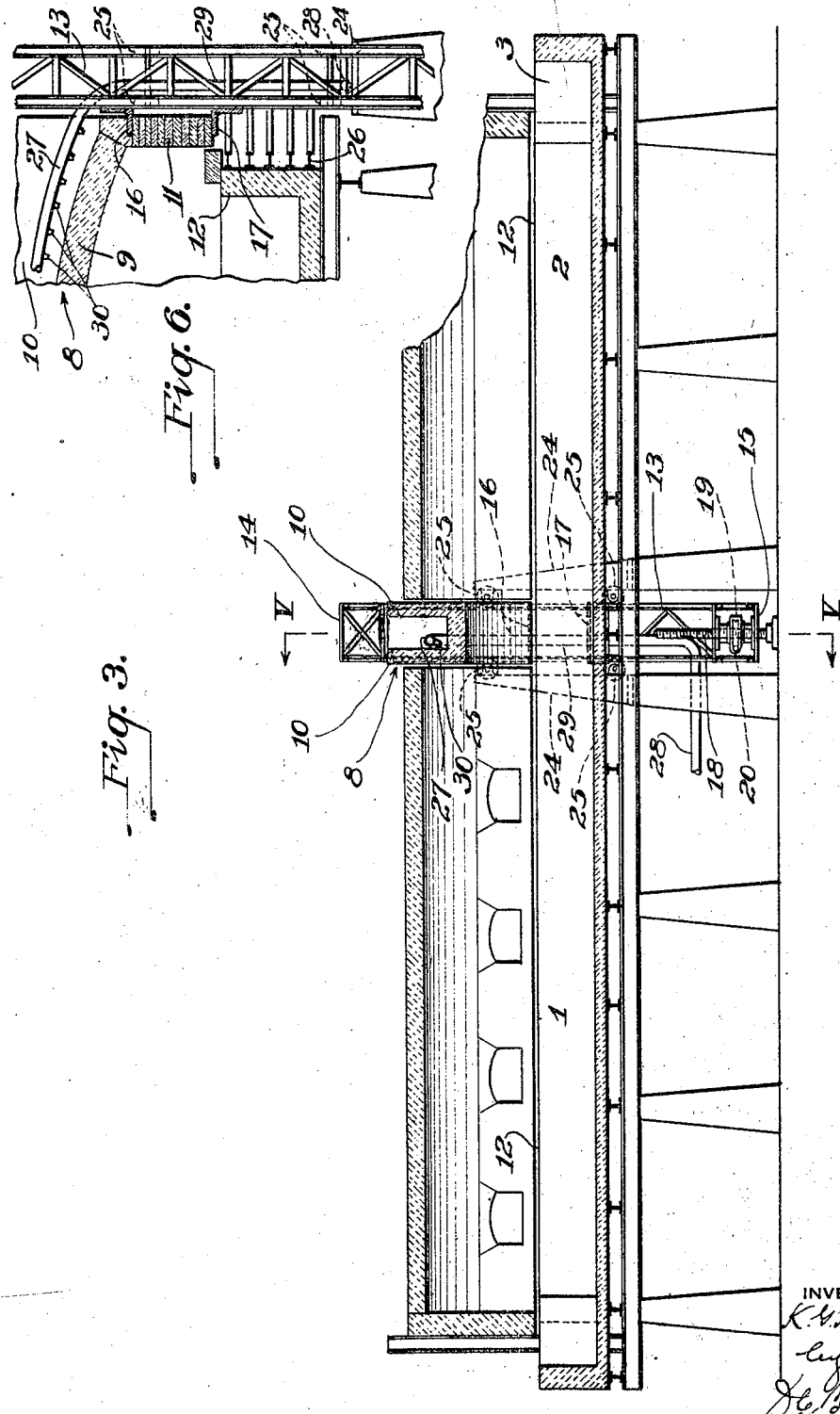
Figure 4:
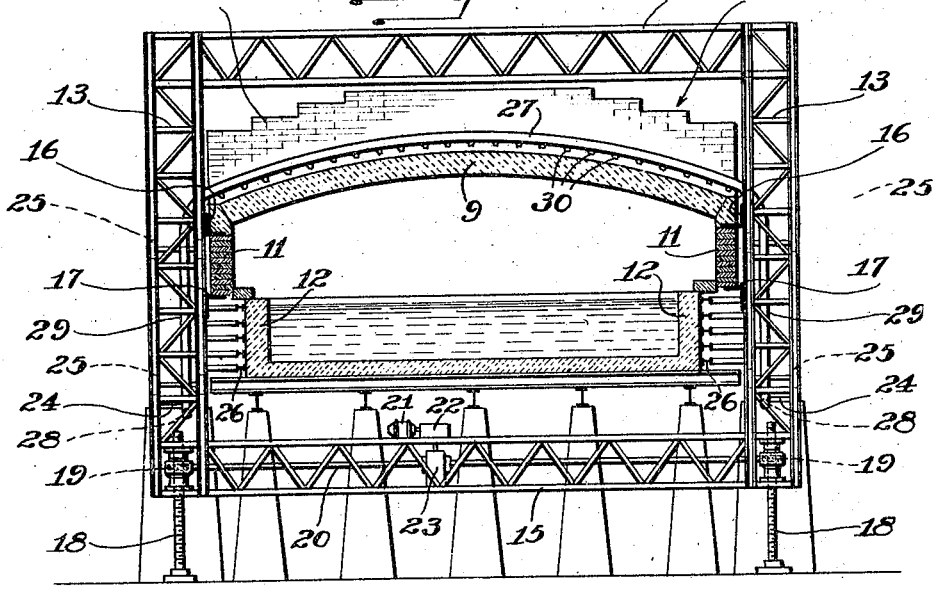
Figure 5:
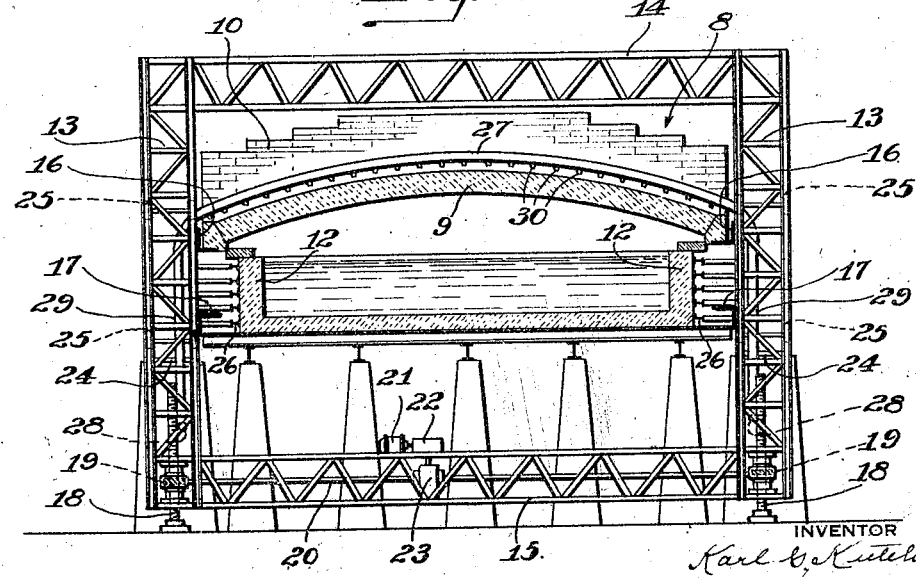

The expedient is useful in glass tank design for a wide variety of purposes, as in practically all cases, it is desirable to have a well controlled difference in temperature between the ends of the tank. The tank illustrated shows merely a bay at the working end of the furnace, from which the glass may be ladled, but any desired intermittent or continuous withdrawing means may be employed at this working end, such as are used in the manufacture of window or plate glass, or in the manufacture of other glass articles. One embodiment of the invention is illustrated in the accompanying drawings, wherein:

Figure 1 is a partial plan view and partial horizontal section taken through the tank construction. Fig. 2 is a vertical section on the line II—II of Fig. 1 with the movable arch section in its uppermost position. Fig. 3 is a section similar to that of Fig. 2, but with the arch section in lowered position. Figs. 4 and 5 are transverse sections on the lines IV—IV and V—V respectively of Figs. 2 and 3. And Fig. 6 is an enlarged detail section through one side of the tank and the movable arch section.

Referring to the drawings, 1 is the melting end of a tank furnace and 2 is the working or withdrawing end, the latter being provided with a bay or withdrawing opening 3 from which the glass may be ladled and used for any desired purpose. The melting end of the furnace is shown as provided with four sets of ports 4, 5, 6 and 7 for supplying the gas and air for heating the glass, the tank or furnace being of the usual regenerator type, in which the flow of combustible mixture of gas and air across the tank is reversed from time to time. Between the melting end 1 and working end 2 of the tank is an adjustable arch section 8 mounted for vertical movement, as indicated by a comparison of Figs. 2 and 3, in which the section is shown in two different positions of adjustment, Fig. 2 showing the arch in completely raised position and Fig. 3 showing it in lowered position, so that a part of the space lying above the surface of the glass between the two ends of the tank is blocked off. The distance which the arch is lowered governs the difference in temperature which it is possible to maintain between the two ends of the furnace. The lower the position of the arch section, the greater the difference in temperature which it is possible to maintain between the tank ends. The arch section is made U-shape in cross section, as indicated in Figs. 2 and 3, and this section is built up of refractory blocks, so that the arch as a whole consists of the bottom supporting wall 9 of arch shape and the side walls 10—10 supported upon the wall 9. At the ends of the arch wall 9 are the depending end walls 11, 11 which are located outward from the center line of the tank a distance such that when the arch section is lowered, these walls will telescope over the side walls 12, 12 (Fig. 4) of the tank. The movable arch section 8 is supported in a rigid rectangular frame made up of commercial sections and comprising the end members 13, 13, the upper transverse tie member 14 lying above the arch section and the lower transverse tie member 15 lying below the bottom of the tank. The end members 13, 13 carry the angles 16, 16 which support the end blocks of the arch wall 9, such angles taking substantially all the weight of the arch wall 9 and its two side walls 10, 10. The depending side walls 11, 11 of the side wall section are carried upon a second pair of angles 17, 17 also adjustably secured to the side frame members 13, 13. The side walls 11 are made up of blocks resting one upon the other, as indicated in Fig. 6, so that when the arch section is lowered to its bottom position with the walls 11 overlapping the side walls 12, 12, the blocks comprising the walls 11, 11 may be removed so that the outer faces of the walls 12, 12 are exposed for the application of cooling means, such as are ordinarily applied to the outer surfaces of tank side walls in order to reduce their temperature and lengthen their life.

The raising and lowering of the framework supporting the arch section is accomplished by means of the screws 18, 18 working through worm wheels 19, 19 swiveled at the lower corners of the framework. The worm wheels are driven by a pair of worms carried by the shaft 20 and this shaft is in turn driven from a motor 21 carried by the frame member 15 and operating through suitable reduction gearing in the casings 22 and 23. In order to guide the framework, a pair of upright pillars 24 are provided (Fig. 1) on the front and rear sides of each side frame member 13, such pillars being anchored at their lower ends in suitable concrete piers so that the columns are rigidly held against lateral deflection. Each of the columns is provided on the side next to the frame member 13 with a pair of rollers 25, 25 (Figs. 1 and 2) which rollers bear against the faces of the angles constituting a part of the frame members 13. This serves to maintain the framework in its proper position when it is adjusted up and down by the screws 18, 18. In order to support the short sections of the side walls 12 of the tank (Fig. 4) at the portion thereof which lies opposite the frame members 13, 13, the series of horizontal eye beams 26 are employed, such eye beams being supported at their ends from the vertical buck stays 31, 31. In order to protect the arch section from overheating, artificial cooling means are preferably employed, such cooling means including a pipe 27 supplied with air under pressure through the connections 28, 29 (Figs. 2 and 3) and provided with a plurality of nozzles 30 for directing the cooling air against the arch wall 9 and the side wall 10 where such walls engage, as this is the location which most requires protection against overheating. When the arch section is in completely lowered position, as indicated in Fig. 5, all of the bricks constituting the side walls 11, 11 are removed, but when the arch section is in an intermediate position, only a part of the bricks are removed and the supporting brackets are adjusted upward on the side members 13, 13, so that the space between the angles 17 and 16 are completely filled with brick work. The wall 9 is shown as an arch, but it will be understood that the invention is equally applicable in a tank which has a flat top, in which case the wall 9 would also be flat and suitably supported. The term "arch member" is used in claims, therefore, comprehends a member in which the wall corresponding to the wall 9 (Fig. 4) may be flat as well as curved.

What I claim is:

1. The combination with a glass melting tank having a melting end and a working end, of an arch member lying between said ends and having depending walls at the ends of such member and mounted for vertical movement, so that a greater or less portion of the member may be moved inside the tank depending upon the vertical position of the member, and means for adjusting the member vertically.

2. The combination with a glass melting tank having a melting end and a working end, of an arch member, U-shape in cross section lying between said tank ends and having depending end walls, and mounted for vertical movement, so that a greater or less portion of the member may be moved inside the tank depending upon the vertical position of the member, and means for adjusting the member vertically.

3. The combination with a glass melting tank having a melting end and a working end, of an arch member lying between said tank ends and having removable depending end walls and mounted for vertical movement, so that a greater or less portion of the member may be moved inside the tank depending upon the vertical position of the member, and means for adjusting the member vertically.

4. The combination with a glass melting tank having a melting end and a working end, of a cut off means lying between said ends and comprising a refractory arch member, a supporting framework for the arch member mounted for vertical movement, guide means for said framework located outside of said tank at the sides thereof, and means for moving the framework vertically.

5. The combination with a glass melting tank having a melting end and a working end, of a cut off means lying between said ends and comprising a refractory arch member, and a supporting framework for the arch member guided for vertical movement, and comprising vertical side members on opposite sides of the tank, a top tie member between the side members above the arch member, and a lower tie member between the side members below the tank, and means for moving the framework vertically.

6. The combination with a glass melting tank having a melting end and a working end, of an arch member, U-shape in cross section lying between said tank ends and having depending end walls, and mounted for vertical movement, means for artificially cooling the arch member between its side and bottom walls, and means for adjusting the member vertically.

In testimony whereof, I have hereunto subscribed my name this 18th day of November, 1925.

KARL G. KUTCHKA.